(12) United States Patent
Macken et al.

(10) Patent No.: US 9,284,399 B2
(45) Date of Patent: Mar. 15, 2016

(54) PROCESS FOR MAKING A FLEXIBLE POLYURETHANE FOAM

(75) Inventors: Johan Antoine Macken, Tildonk (BE); Thomas Julien Joncheray, Wavre (BE); Jan Vandenbroeck, Scherpenheuvel-Zichern (BE)

(73) Assignee: Huntsman International LLC, The Woodlands, TX (US)

( * ) Notice: Subject to any disclaimer, the term of this patent is extended or adjusted under 35 U.S.C. 154(b) by 67 days.

(21) Appl. No.: 14/117,883

(22) PCT Filed: Jul. 24, 2012

(86) PCT No.: PCT/EP2012/064466
§ 371 (c)(1),
(2), (4) Date: Nov. 15, 2013

(87) PCT Pub. No.: WO2013/014143
PCT Pub. Date: Jan. 31, 2013

(65) Prior Publication Data
US 2014/0309324 A1 Oct. 16, 2014

(30) Foreign Application Priority Data
Jul. 26, 2011 (EP) .................................... 11175338

(51) Int. Cl.
*C08G 18/32* (2006.01)
*C08G 18/66* (2006.01)
*C08G 18/10* (2006.01)
*C08G 18/16* (2006.01)
*C08G 18/48* (2006.01)
*C08J 9/00* (2006.01)
*C08G 18/22* (2006.01)
*C08G 101/00* (2006.01)

(52) U.S. Cl.
CPC ............ *C08G 18/3203* (2013.01); *C08G 18/10* (2013.01); *C08G 18/163* (2013.01); *C08G 18/4808* (2013.01); *C08G 18/6688* (2013.01); *C08J 9/00* (2013.01); *C08G 18/161* (2013.01); *C08G 18/22* (2013.01); *C08G 18/222* (2013.01); *C08G 18/4816* (2013.01); *C08G 18/4837* (2013.01); *C08G 2101/005* (2013.01); *C08G 2101/0008* (2013.01); *C08G 2101/0083* (2013.01)

(58) Field of Classification Search
CPC ...... C08G 18/22; C08G 18/63; C08G 18/161; C08G 18/222; C08G 18/4808; C08G 18/4816; C08G 18/4837
See application file for complete search history.

(56) References Cited

U.S. PATENT DOCUMENTS

| 4,173,691 | A | 11/1979 | Treadwell | |
| 4,223,098 | A | 9/1980 | Treadwell | |
| 5,212,209 | A * | 5/1993 | Weaver et al. | 521/122 |
| 2002/0016376 | A1* | 2/2002 | Eyrisch et al. | 521/129 |
| 2005/0131095 | A1 | 6/2005 | Yu et al. | |
| 2006/0293486 | A1* | 12/2006 | Emmrich et al. | 528/44 |
| 2009/0088489 | A1 | 4/2009 | Terheiden et al. | |
| 2009/0326089 | A1* | 12/2009 | Haas et al. | 521/128 |
| 2010/0069518 | A1 | 3/2010 | Mispreuve et al. | |
| 2013/0137787 | A1* | 5/2013 | Burdeniuc et al. | 521/115 |
| 2013/0178550 | A1* | 7/2013 | Aou et al. | 521/176 |
| 2013/0331473 | A1* | 12/2013 | Motta et al. | 521/160 |

FOREIGN PATENT DOCUMENTS

| DE | 19928675 | 12/2000 |
| EP | 2042534 | 4/2009 |
| GB | 980139 | 1/1965 |
| GB | 1150425 | 4/1969 |
| GB | 1480972 | 7/1977 |
| WO | WO 2010034770 A1 * | 4/2010 |
| WO | WO 2011163113 A1 * | 12/2011 |

OTHER PUBLICATIONS

G. Woods, The ICI Polyurethanes Book, 2nd edition, p. 32-35 (1990).

* cited by examiner

*Primary Examiner* — Melissa Rioja
(74) *Attorney, Agent, or Firm* — Robert A. Diaz

(57) ABSTRACT

Process for making a flexible polyurethane foam by reacting a polyisocyanate and a polyol composition in the presence of water, a reactive amine catalyst and a specific metal salt. The foams have a low level of volatile organic compounds (VOCs) and a desirable combination of mechanical and durability properties.

10 Claims, No Drawings

PROCESS FOR MAKING A FLEXIBLE POLYURETHANE FOAM

CROSS-REFERENCE TO RELATED APPLICATIONS

This application is the National Phase of International Application PCT/EP2012/064466 filed Jul. 24, 2012 which designated the U.S. and which claims priority to European App. Serial No. 11175338.0 filed Jul. 26, 2011. The noted applications are incorporated herein by reference.

FIELD OF INVENTION

The present invention relates to a process for making a flexible polyurethane foam. Such processes are widely known since a long time. More recently the intention is to prepare foams which release less volatile organic compounds (VOCs). A way to achieve this is to replace the widely used unreactive amine catalysts, like triethylene diamine, with reactive amine catalysts, like N-(3-dimethylaminopropyl)-N, N-diisopropanolamine.

The use of such reactive amine catalysts has as disadvantage that for a given flexible foam formulation (i.e. at the same index and at about the same density) the hardness decreases compared when using unreactive amine catalyst.

Surprisingly we have now found that such hardness decrease may be considerably limited or even avoided when a certain catalyst selected from zinc carboxylates is used together with such reactive amine catalysts. In addition a wider processing window is obtained.

SUMMARY OF THE INVENTION

It is an object of the present invention to improve the mechanical and/or durability properties and at the same time lowering the VOC emissions significantly of a polyurethane flexible material by using a suitable metal salt catalyst selected from zinc carboxylates in combination with reactive amine catalysts More particularly it is the object of the invention to use said zinc carboxylates in combination with reactive amine catalysts in the production process to lower the VOC emissions in a polyurethane flexible foam significantly down to values below 100 µg/g (ppm), more preferably below 50 µg/g (ppm) and most preferred below 20 µg/g (ppm). Said foam may be a produced according to a slabstock or a moulding process.

In addition it is the object of the invention to use said zinc carboxylates in combination with reactive amine catalysts in the production process to improve the mechanical properties such as hardness, tear strength and/or the durability properties such as (wet) compression set value and hardness loss after dynamic fatigue in a polyurethane flexible foam. Said foam may be produced according to a slabstock or a moulding process.

According to a first aspect of the present invention, a flexible polyurethane foam is disclosed which is obtained using at least a reactive tertiary amine catalyst and a zinc carboxylate catalyst. Said foam is having a hardness of >80 N (measured as Indentation Load Deflection ILD according to ISO 2439 at 40% compression), a humid compression set value at 70% and 50° C. of less than 5% (measured according to HPU-FT-010), a tear strength higher than 200 N/m, preferably higher than 250 N/m (measured according to ISO 8067), a hardness loss (ILD 40%) after dynamic fatigue of less than 20% (measured according to ISO 3385) and a VOC emission value<100 µg/g (measured according to VDA 278).

According to an embodiment, the flexible polyurethane foam is preferably having a VOC emission below 50 µg/g and more preferably below 20 µg/g and a humid compression set value at 70% and 50° C. at >95% relative humidity of preferably less than 1%.

According to an embodiment, the reactive amine catalyst is selected from tertiary amine catalysts which have at least one isocyanate-reactive hydrogen atom and preferably one or more primary and/or secondary amine groups and/or one or more hydroxy groups and the zinc carboxylate catalyst is selected from a zinc carboxylate catalyst having 5-18 and preferably 6-12 carbon atoms.

According to a second aspect of the present invention, a process is disclosed for making the flexible polyurethane foam according to the first aspect of the invention. Said process comprises reacting a polyisocyanate and a polyol composition at an index of 95-125 wherein the polyol composition comprises a polyoxyethylene polyoxypropylene polyol (a1) having an oxyethylene content of 50-95% by weight, calculated on the weight of this polyol (a1), and a polyoxypropylene polyol (a2), optionally comprising oxyethylene groups, the polyol having an oxyethylene content of 0-49% by weight, calculated on the weight of this polyol (a2), wherein the weight ratio of polyol (a1) and (a2) varies from 90:10 to 50:50 and preferably from 75:25 to 65:35 and wherein the reaction is conducted in the presence of 1) 1-4 parts by weight (pbw) of water, 2) 0.2-2 pbw of a reactive amine catalyst, 3) 0.05-0.5 pbw of a zinc carboxylate catalyst having 5-18 and preferably 6-12 carbon atoms, 4) 0.1-5 pbw of a surfactant and 5) optionally up to 10 pbw of an isocyanate-reactive chain extender having 2-8 reactive hydrogen atoms and a molecular weight of up to 999, the amounts of the water, the reactive amine catalyst, the zinc carboxylate, the surfactant and the chain extender being calculated per 100 pbw of polyol (a1)+polyol (a2).

According to an embodiment, the reactive amine catalyst is selected from tertiary amine catalysts which have at least one isocyanate-reactive hydrogen atom and preferably one or more primary and/or secondary amine groups and/or one or more hydroxy groups.

According to an embodiment, the polyoxyethylene polyoxypropylene polyol (a1) is having an average nominal hydroxyl functionality of 2-4, an oxyethylene content of 65-80% by weight calculated on the weight of the polyol (a1) and an average molecular weight of 2000-7000.

According to an embodiment, the polyoxypropylene polyol (a2) is having an average nominal hydroxyl functionality of 2-4, an average molecular weight of 2000-7000 and an oxyethylene content of at most 20% by weight, calculated on the weight of the polyol (a2).

According to a third aspect of the present invention, the use of reactive tertiary amine catalysts in combination with zinc carboxylate catalyst having 5-18 and preferably 6-12 carbon atoms is disclosed for improving the mechanical properties and/or durability properties of a flexible polyurethane foam.

The independent and dependent claims set out particular and preferred features of the invention. Features from the dependent claims may be combined with features of the independent or other dependent claims as appropriate.

The above and other characteristics, features and advantages of the present invention will become apparent from the following detailed description which illustrates the principles of the invention. This description is given for the sake of example only, without limiting the scope of the invention.

DEFINITIONS

In the context of the present invention the following terms have the following meaning:

1) isocyanate index or NCO index or index:
   the ratio of NCO-groups over isocyanate-reactive hydrogen atoms present in a formulation, given as a percentage:

$$\frac{[NCO] \times 100}{[activeHatoms]}\%$$

In other words the NCO-index expresses the percentage of isocyanate actually used in a formulation with respect to the amount of isocyanate theoretically required for reacting with the amount of isocyanate-reactive hydrogen used in a formulation.
   It should be observed that the isocyanate index as used herein is considered from the point of view of the actual polymerisation process preparing the foamed material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index.
2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen and one primary amine group is considered to comprise one reactive hydrogen.
3) Reaction system: a combination of components wherein the polyisocyanates are kept in one or more containers separate from the isocyanate-reactive components.
4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.
5) The word "average" refers to "number average" unless indicated otherwise.
6) Unless otherwise expressed, the weight percentage (indicated as % wt or wt %) of a component in a composition refers to the weight of the component over the total weight of the composition in which it is present, and is expressed as percentage.
7) Unless otherwise expressed, parts by weight (pbw) of a component in a composition refers to the weight of the component over the total weight of the composition in which it is present, and is expressed as pbw.
8) Unless otherwise specified, density is measured on foam samples made under atmospheric conditions according to ISO 845.
9) Unless otherwise specified, ILD hardness is Indentation Load Deflection at 40% measured according to ISO 2439. A hardness loss (ILD at 40%) after dynamic fatigue as referred to in this invention is measured according to ISO 3385.
10) Unless otherwise specified, CLD hardness is Compression Load Deflection at 40% measured according to ISO 3386/1.
11) Unless otherwise specified, VOC refers to Volatile Organic Compounds and VOC values referred to in this invention are measured according to the VDA 278 test (thermal desorption analysis of organic emissions for the characterization of non-metallic materials for automobiles).
12) Unless otherwise specified, a dry compression set value at 75% and 70° C. and a dry compression set value at 90% and 70° C. is measured according to ISO 1856 and is expressed in %.
13) Unless otherwise specified, a humid compression set value (CSV) at 70% and 50° C. is measured according to HPU-FT-010. The HPU-FT-010 test is carried out according to ISO 1856 C with the provisio that sample dimensions of 100×100×50 mm are used, the test samples are preconditioned for at least 24 hours at a temperature of 20° C. and a relative humidity of 50% before the test and the test conditions during the humid compression set test at 70% compression, 50° C. and 95% relative humidity for 22 hours. The value obtained is expressed in % and is calculated according to following formula:

$$CSV = \frac{Ho - H2}{Ho - H1}$$

Wherein
   Ho=original thickness
   H1=thickness after compression (=thickness of spacers)
   H2=final thickness of test sample

DETAILED DESCRIPTION

The present invention is concerned with a flexible polyurethane foam prepared using a reactive amine catalyst and a zinc carboxylate catalyst.

The flexible foam according to the invention has unique properties such as having an hardness of >80 N (measured as Indentation Load Deflection ILD according to ISO 2439 at 40% compression), a humid compression set value at 70% and 50° C. of less than 5% (measured according to HPU-FT-010), a tear strength higher than 200 N/m (measured according to ISO 8067), a hardness loss (ILD 40%) after dynamic fatigue of less than 20% (measured according to ISO 3385) and a VOC emission value<100 μg/g (measured according to VDA 278).

Preferably, the flexible polyurethane foam according to the invention is having a VOC emission below 50 μg/g and more preferred below 20 μg/g, a tear strength more than 250 N/m and a humid compression set value at 70% and 50° C. of less than 1%.

Furthermore a process is disclosed for making the flexible polyurethane foam according to the invention. Said process comprising at least reacting a polyisocyanate and a polyol composition at an index of 95-125 wherein the polyol composition comprises a polyoxyethylene polyoxypropylene polyol (a1) having an oxyethylene content of 50-95% by weight, calculated on the weight of this polyol (a1), and a polyoxypropylene polyol (a2), optionally comprising oxyethylene groups, the polyol having an oxyethylene content of 0-49% by weight, calculated on the weight of this polyol (a2), wherein the weight ratio of polyol (a1) and (a2) varies from 90:10 to 50:50 and preferably from 75:25 to 65:35 and wherein the reaction is conducted in the presence of 1) 1-4 and preferably 1.3-4 parts by weight (pbw) of water, 2) 0.2-2 pbw of a reactive amine catalyst, 3) 0.05-0.5 pbw of a zinc carboxylate catalyst having 5-18 and preferably 6-12 carbon atoms, 4) 0.1-5 pbw, preferably 0.2-3 pbw and more preferably 0.2-2 pbw of a surfactant and 5) optionally up to 10 pbw of an isocyanate-reactive chain extender having 2-8 reactive hydrogen atoms and a molecular weight of up to 999, the amounts of the water, the reactive amine catalyst, the zinc carboxylate, the surfactant and the chain extender being calculated per 100 pbw of polyol (a1)+polyol (a2).

The use of zinc containing catalysts has been proposed in the past; see GB 1480972, GB 1150425, U.S. Pat. No. 4,173,691, U.S. Pat. No. 4,223,098 and US 2010/0069518. However they have not been proposed in the above process for making flexible foam and they have not been recommended in order to increase the hardness of flexible foams made from reaction mixtures wherein reactive amine catalysts are used in order to make foams having a lower level of VOC's.

The polyisocyanate used for making the foam according to the present invention may be selected from aliphatic and, preferably, aromatic polyisocyanates. Preferred aliphatic polyisocyanates are hexamethylene diisocyanate, isophorone diisocyanate, methylene dicyclohexyl diisocyanate and cyclohexane diisocyanate and preferred aromatic polyisocyanates are toluene diisocyanate, naphthalene diisocyanate, tetramethylxylene diisocyanate, phenylene diisocyanate, tolidine diisocyanate and, in particular, diphenylmethane diisocyanate (MDI) and polyisocyanate compositions comprising diphenylmethane diisocyanate (like so-called polymeric MDI, crude MDI, uretonimine modified MDI and prepolymers having free isocyanate groups made from MDI and polyisocyanates comprising MDI) and mixtures of such polyisocyanates. MDI and polyisocyanate compositions comprising MDI are most preferred and especially those selected from 1) a diphenylmethane diisocyanate comprising at least 35%, preferably at least 60% by weight of 4,4'-diphenylmethane diisocyanate (4,4'-MDI); 2) a carbodiimide and/or uretonimine modified variant of polyisocyanate 1), the variant having an NCO value of 20% by weight or more; 3) a urethane modified variant of polyisocyanate 1) and/or 2), the variant having an NCO value of 20% by weight or more and being the reaction product of an excess of polyisocyanate 1) and/or 2) and of a polyol having an average nominal hydroxyl functionality of 2-8 and preferably 2-4 and an average molecular weight of at most 1000; 4) a diphenylmethane diisocyanate comprising a homologue comprising 3 or more isocyanate groups; 5) prepolymers having an NCO value of 5-30% by weight and being the reaction product of any one or more of polyisocyanates 1)-4) and of a polyol having an average nominal hydroxyl functionality of 2-8 and preferably 2-4 and an average molecular weight of more than 1000 and up to 8000; and 6) mixtures of any of the aforementioned polyisocyanates.

Polyisocyanate 1) comprises at least 35% by weight of 4,4'-MDI. Such polyisocyanates are known in the art and include pure 4,4'-MDI and isomeric mixtures of 4,4'-MDI, 2,4'-MDI and 2,2'-MDI. It is to be noted that the amount of 2,2'-MDI in the isomeric mixtures is rather at an impurity level and in general will not exceed 2% by weight, the remainder being 4,4'-MDI and 2,4'-MDI. Polyisocyanates as these are known in the art and commercially available; for example Suprasec® MPR and Suprasec® 1306 ex Huntsman (Suprasec® is a trademark of the Huntsman Corporation or an affiliate thereof which has been registered in one or more but not all countries).

The carbodiimide and/or uretonimine modified variants of the above polyisocyanate 1) are also known in the art and commercially available; e.g. Suprasec® 2020, ex Huntsman. Urethane modified variants of the above polyisocyanate 1) are also known in the art, see e.g. The ICI Polyurethanes Book by G. Woods 1990, $2^{nd}$ edition, pages 32-35.

Polyisocyanate 4) is also widely known and commercially available. These polyisocyanates are often called crude MDI or polymeric MDI. Examples are Suprasec® 2185, Suprasec® 5025 and Suprasec® DNR ex Huntsman.

The prepolymers (polyisocyanate 5)) are also widely known and commercially available. Examples are Suprasec® 2054 and Suprasec® 2061, both ex Huntsman.

Mixtures of the aforementioned polyisocyanates may be used as well, see e.g. The ICI Polyurethanes Book by G. Woods 1990, $2^{nd}$ edition pages 32-35. An example of such a commercially available polyisocyanate is Suprasec® 2021 ex Huntsman.

Polyols (a1) used in making the flexible foam according to the present invention preferably have an average molecular weight of 1000-8000, an oxyethylene content of 50-95% by weight calculated on the weight of the polyol (a1) and an average nominal hydroxyl functionality of 2-6, are obtained by the polymerisation of ethylene oxide and propylene oxide in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, cyclohexane-dimethanol, glycerol, trimethylolpropane, 1,2,6-hexanetriol, pentaerythritol and sorbitol. Mixtures of initiators and/or cyclic oxides may be used. The polyoxyethylene-polyoxypropylene polyols are obtained by the simultaneous or sequential addition of ethylene and propylene oxides to initiators as fully described in the prior art. Random copolymers, block copolymers and combinations thereof may be used. Mixtures of the said polyols may be used as well. Most preferred are polyoxyethylene polyoxypropylene polyols having an average nominal hydroxyl functionality of 2-4, an oxyethylene content of 65-80% by weight calculated on the weight of the polyol (a1) and an average molecular weight of 2000-7000.

Preferred polyols are those having a level of unsaturation of at most 0.03, preferably at most 0.02 and most preferably at most 0.01 meq/g (milli-equivalents of unsaturated groups per grain of polyol) as measured according to ISO 17710.

Such polyols are known in the art and/or commercially available. Examples of such polyols are Daltocel® F442, Daltocel® F444 and Daltocel® F555; all ex Huntsman. Daltocel® is a trademark of the Huntsman Corporation or an Affiliate thereof which has been registered in one or more but not all countries. Other examples are Desmophen® 41WB01 ex Bayer and Rokopol® M1170 ex PCC Rokita.

Polyols (a2) used in making the flexible foam according to the present invention preferably have an average molecular weight of 1000-8000 and an average nominal hydroxyl functionality of 2-6, are obtained by the polymerisation of propylene oxide and optionally ethylene oxide in the presence, where necessary, of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, cyclohexane-dimethanol, glycerol, trimethylolpropane, 1,2,6-hexanetriol, pentaerythritol and sorbitol. Mixtures of initiators and/or cyclic oxides may be used. The polyoxyethylene-polyoxypropylene polyols are obtained by the simultaneous or sequential addition of ethylene and propylene oxides to initiators as fully described in the prior art. Random copolymers, block copolymers and combinations thereof may be used. Mixtures of the said polyols may be used as well. Most preferred are polyoxypropylene polyols and polyoxyethylene polyoxypropylene polyols having an average nominal hydroxyl functionality of 2-4 and an average molecular weight of 2000-7000 and an oxyethylene content of at most 20% by weight, calculated on the weight of the polyol (a2). Polyols of this type (a2) may have been made by the more traditional KOH-catalysed process but also by CsOH-catalysis or DMC-catalysis. The polyols may contain particulate materials known in the art, like in so called PIPA, PHD or SAN polyols.

Polyols (a2) are widely known as such and commercially available. Examples are Daltocel® F428 and Daltocel® F435 ex Huntsman, Alcupol® F4811 ex Repsol, Voranol® CP3322, Voranol® NC 700 and Voranol® HL 400 ex DOW, Caradol® SC 48-08 ex Shell and Arcol® 1374 ex Bayer.

Optionally an isocyanate-reactive chain extender may be used having 2-8 reactive hydrogen atoms and a molecular weight of up to 999. Examples are butanediol, ethylene glycol, propylene glycol, diethylene glycol, triethylene glycol, dipropylene glycol, ethanolamine, diethanolamine, triethanolamine, cyclohexane dimethanol, glycerol, trimethylolpropane, 1,2,6-hexanetriol, pentaerythritol, sorbitol and polyoxyethylene diols having an average molecular weight between 200 and 600 and mixtures of such compounds.

The zinc carboxylate catalyst has 5-18 carbon atoms and preferably 6-12 carbon atoms. Examples are the hexanoate, the octanoate, the ethylhexanoate, the decanoate and the dodecanoate.

The surfactant is used in an amount of 0.1-5, preferably 0.2-3 and more preferably 0.2-2 pbw per 100 pbw of polyol (a1)+polyol (a2). The surfactant is preferably a polysiloxane polymer and more in particular an polyoxyalkylene polysiloxane polymer, preferably having a molecular weight of 5000-60000.

The reactive amine catalyst may be selected from state of the art known tertiary amine catalysts which are able to promote the reaction between a polyisocyanate and a polyol thereby forming a urethane bond and whereby said catalyst is chemically incorporated in to the polyurethane matrix. Preferably said tertiary amine catalysts have at least one isocyanate-reactive hydrogen atom and preferably one or more primary and/or secondary amine groups and/or one or more hydroxy groups.

Examples of suitable reactive tertiary amine catalysts are the following catalysts; between brackets a commercial product name is given:
N,N-3-dimethylaminopropylamine (Jeffcat® DMAPA),
N,N-dimethylethanolamine (Jeffcat® DMEA),
N,N-dimethylaminoethoxyethanol (Jeffcat® ZR70),
N,N,N'-trimethyl-N'-hydroxyethyl-bisaminoethylether (Jeffcat® ZF10),
N,N-bis-(3-dimethylaminopropyl)-N-isopropanolamine (Jeffcat® ZR50),
N-(3-dimethylaminopropyl)-N,N-diisopropanolamine (Jeffcat® DPA),
N,N,N'-trimethyl-N'-(hydroxyethyl)ethylenediamine (Jeffcat® Z110),
tetramethyliminobispropylamine (Jeffcat® Z130),
N-[2-[2-(dimethylamino)ethoxy]ethyl]-N-methyl-1,3-propanediamine (Dabco® NE 300).
2-(dimethylamino-)ethan-1-ol (Jeffcat® TD 20)
2-(2-(2-dimethylaminoethoxy-)ethyl methyl amino-)ethanol (Dabco® NE 1061)
bis(dimethylaminomethyl-)phenol (Dabco® TMR 30)

Most preferred ones are the reactive tertiary amine catalysts which have 1 primary or secondary amine group and/or 1-2 hydroxy groups. Dabco is a trademark of the Air Products corporation and Jeffcat is a trademark of the Huntsman corporation or one of its Affiliates, which trademark has been registered in one or more but not all countries; these catalysts are available from Huntsman or Air Products.

Triethanolamine and substituted reaction products of triethanolamine are not regarded as reactive tertiary amine catalyst and are to be considered as chain extenders only.

The index which is applied in making the flexible foam according to the present invention is 95-125 and preferably 100-120.

Optionally the foams may be made in the presence of additives and auxiliaries used in the polyurethanes art, like fire retardants, other blowing agents, other catalysts, smoke-suppressants, colouring agents, carbon black, anti-microbial agents, anti-oxidants, mould release agents, fillers, fertilizers, gels, phase change materials and fibers.

The foams are made by combining and mixing all ingredients and allowing the reaction to take place. The foams may be made according to a free rise process, a moulding process, a slabstock process including processes involving variable pressure foaming and liquid $CO_2$ blowing, a lamination process or spray process.

The ingredients may be fed independently to the mixing head of a foaming machine Preferably the polyols, the water, the catalysts and the optional ingredients are premixed before they are mixed with the polyisocyanate.

The densities of the foams may range of from 20-80 and preferably 20-65 and most preferably 35-50 kg/m$^3$.

EXAMPLES

Examples 1-4

Flexible polyurethane foams were prepared by mixing a polyisocyanate and a polyol composition and allowing the mixture to react and foam in an open box of 125 liter at an index of 115. In the first example Dabco® 33 LV (an unreactive amine catalyst, 1% wt on polyols (a1) and (a2)) was used; in the second example a mixture of 3 reactive amine catalysts was used (1.5% wt on polyols (a1) and (a2)) and in the third example this catalyst mixture (1.5% wt on polyols (a1) and (a2)) was used again together with zinc octoate (0.2% wt on polyols (a1) and (a2)). The 1.5% wt mixture of reactive amine catalyst was composed of 0.65% wt Jeffcat® Z130, 0.65% wt of Jeffcat® DPA and 0.2% wt of Dabco® NE-300.

In a fourth example the catalyst package of example 3 was used again but now with less Jeffcat® Z130 and Jeffcat® DPA. Both were reduced from 0.65% wt to 0.25% wt.

The polyisocyanate used was Suprasec® 6058 which is commercially available from Huntsman and which is a mixture of 1) a prepolymer made from about 47 pbw of Suprasec® MPR and about 53 pbw of Daltocel® F442 (56% wt), 2) difunctional MDI with an amount of about 19% 2,4'-MDI (39% wt) and 3) Suprasec® 2020 (5% wt).

The polyol composition was a mixture of 70 pbw of Daltocel® F444, 30 pbw of Alcupol® F4811, 1 pbw of diethanolamine (chain extender), catalyst, 1.5 pbw of Dabco® DC 198 (silicone surfactant) and 3 pbw of water.

When example 1 was repeated without Alcupol® F4811 and surfactant a useless foam was obtained with completely closed cells.

The foams obtained in the first 4 examples had the properties as indicated in Table 1.

TABLE 1

Flexible foam formulations, processing parameters and physical properties

| Examples | 1(*) | 2(*) | 3 | 4 |
|---|---|---|---|---|
| Unreactive amine catalyst | + | − | − | − |
| Reactive amine catalyst | − | + | + | + |
| Zinc carboxylate | − | − | + | + |
| Density, kg/m3 | 40 | 41 | 42 | 41 |
| Hardness, ILD at 40% (ISO 2439), N | 135 | 108 | 128 | 126 |

(*)comparative examples

Examples 5-9

Flexible polyurethane foams were prepared by mixing a polyisocyanate and a polyol composition (said polyol composition comprising the additives and the catalysts) and allowing the mixture to react in a free rise mould of 125 liter at an isocyanate index of 115. The ingredients used are indicated in Table 2 and are expressed in parts by weight (pbw) calculated on the total weight of polyols (a1) and (a2).

In example 5 Dabco® 33 LV (an unreactive amine catalyst) was used.

In example 6 Jeffcat® Z 131 together with Dabco® NE300 (reactive amine catalysts) were used.

In example 7 Jeffcat® Z 131 together with Dabco NE300 (reactive amine catalysts) were used together with zinc octoate (Coscat® Z22R).

In example 8 the catalyst package of example 7 was used again but now with less Jeffcat® Z131.

In example 9 Dabco® 33 LV (an unreactive amine catalyst) was used in combination with Jeffcat® Z 130 and Jeffcat® ZF 10 (reactive amine catalysts).

The polyisocyanate composition used is Suprasec® 6058 which is commercially available from Huntsman and which is a mixture of 1) a prepolymer made from about 47 pbw of Suprasec® MPR and about 53 pbw of Daltocel® F442 (56% wt), 2) difunctional MDI with an amount of about 19% 2,4'-MDI (39% wt) and 3) Suprasec® 2020 (5% wt).

The polyol composition used was a mixture of Daltocel® F444 and Alcupol® F4811 further comprising additions of diethanolamine (chain extender), catalysts as indicated above, surfactants (Dabco® DC 198 being a silicone surfactant) and water.

Examples 10-15

Flexible polyurethane foams were prepared using low pressure dispensing machine by mixing a polyisocyanate and a polyol composition (said polyol composition comprising the additives and the catalysts) and allowing the mixture to react in free rise mould of 50*50*50 cm³. The isocyanate index and the ingredients used are indicated in Table 3, the ingredients are expressed in part by weight calculated on the total weight of polyols (a1) and (a2).

The polyisocyanate composition used in examples 13, 14 and 15 is Surpasec® 6058 commercially available from Huntsman and which is a mixture of 1) a prepolymer made from about 47 pbw of Suprasec® MPR and about 53 pbw of Daltocel® F442 (56% wt), 2) difunctional MDI with an amount of about 19% 2,4'-MDI (39% wt) and 3) Suprasec® 2020 (5% wt).

The polyisocyanate composition used in examples 11 and 12 is a mixture of commercially available Suprasec® 2721, Suprasec® 2615 and Suprasec® 2465 from Huntsman.

The polyisocyanate composition used in example 10 is a mixture of commercially available Suprasec® 2615 and Suprasec® 1055 from Huntsman.

The polyol composition used in examples 14 and 15 was a mixture of Daltocel® F444 (is a glycerol initiated polyoxyethylene polyoxypropylene polyol with an overall EO content of about 77 wt % (on polyol) having an $OH_v=36$ and an EO-tip of 20 wt %) and Daltocel® F428 (a glycerol initiated polyoxypropylene polyol having 15 wt % ethyleneoxide as tip and an $OH_v=28$).

The polyol composition used in example 13 was a mixture of Rokopol® M1170 (a polyol similar to Daltocel® F428) and Caradol® SC 48-08 (a polyoxyethylene polyoxypropylene polyol having a random EO content of less than 15 wt %).

The polyol composition used in examples 10 was Alcupol® F2831 (a polyol similar to Daltocel® F428).

The polyol composition used in examples 11 was Arcol® 1374 (a polyol similar to Daltocel® F428).

The polyol composition used in examples 12 was Voranol® 6150 (a polyol similar to Daltocel® F428).

The polyols used are further comprising additions of diethanolamine (chain extender), catalysts as indicated below, surfactants (e.g. Dabco® DC 198 being a silicone surfactant) and water.

In example 10 Jeffcat® Z131 (reactive amine catalysts) and Dabco EG (unreactive amine catalysts) were used.

In examples 11 and 12 Jeffcat® Z 131 (reactive amine catalysts) together with Dabco 33LV (unreactive amine catalysts) were used.

In examples 13, 14 and 15 Jeffcat® Z 131 and Dabco® NE300 (reactive amine catalysts) were used together with zinc octoate (Coscat® Z22R). The catalyst package for examples 13, 14 and 15 is identical, only different type of polyols were used.

Examples 16-19

Flexible polyurethane foams were prepared using low pressure dispensing machine by mixing a polyisocyanate and a polyol composition (said polyol composition comprising the additives and the catalysts) and allowing the mixture to react in free rise mould of 50*50*50 cm³. The isocyanate index and the ingredients used are indicated in Table 4, the ingredients are expressed in part by weight calculated on the total weight of polyols (a1) and (a2).

The polyisocyanate composition used in examples 16, 17, 18 and 19 is Suprasec® 6058 which is commercially available from Huntsman and which is a mixture of 1) a prepolymer made from about 47 pbw of Suprasec® MPR and about 53 pbw of Daltocel® F442 (56% wt), 2) difunctional MDI with an amount of about 19% 2,4'-MDI (39% wt) and 3) Suprasec® 2020 (5% wt).

The polyol composition used in examples 16, 17, 18 and 19 was a mixture of Daltocel® F444 (is a glycerol initiated polyoxyethylene polyoxypropylene polyol with an overall EO content of about 77 wt % (on polyol) having an $OH_v=36$ and an EO-tip of 20 wt %) and Daltocel® F428 (a glycerol initiated polyoxypropylene polyol having 15 wt % ethyleneoxide as tip and an $OH_v=28$).

The polyols used are further comprising additions of diethanolamine (chain extender), catalysts as indicated below, surfactants (e.g. Dabco® DC 198 being a silicone surfactant) and water.

In example 16 and 17 Jeffcat® Z131 and Dabco® NE300 (reactive amine catalysts) were used.

In examples 18 and 19, the same catalyst package as used in examples 16 and 17 is applied but with further additions of zinc octoate (Coscat® Z22R).

TABLE 2

Flexible foam formulations, processing parameters and physical properties

| | Example nr (Reference) | | | | |
|---|---|---|---|---|---|
| | 5 (*) (CV1976) | 6 (*) (CV1984) | 7 (CV1988) | 8 (CV1989) | 9 (*) LLP1087D |
| Unreactive amine catalyst | + | − | − | − | + |
| Reactive amine catalyst | − | + | + | + | + |
| Zinc Carboxylate | − | − | + | + | − |
| Formulation | | | | | |
| Suprasec ® 6058 | 95.2 | 95.4 | 95.4 | 95.37 | 98.6 |
| Daltocel ® F444 | 70 | 70 | 70 | 70 | 70 |
| Alcupol ® F4811 | 30 | 30 | 30 | 30 | 30 |
| Dabco ® 33LV | 1 | | | | 0.354 |
| Jeffcat ® Z131 | | 1.3 | 1.3 | 0.5 | |
| Jeffcat ® Z130 | | | | | 0.443 |
| Jeffcat ® ZF10 | | | | | 0.204 |
| Dabco ® NE300 | | 0.2 | 0.2 | 0.2 | |
| Coscat ® Z22R | | | 0.2 | 0.2 | |
| DEOA | 1 | 1 | 1 | 1 | 1 |
| Dabco ®DC 198 | 1.5 | 1.5 | 1.5 | 1.5 | 1.5 |
| $H_2O$ | 3 | 3 | 3 | 3 | 3 |
| ISO Index | 115 | 115 | 115 | 115 | 119.9 |
| Processing parameters | | | | | |
| String time (s) | 56 | 65 | 45 | 70 | — |
| End of Rise (s) | 133 | 126 | 114 | 128 | 120 |
| Recession (%) | 0.48 | 1.34 | 1.93 | 1.94 | — |
| Physical properties, Test Norm, Unit | | | | | |
| Density, ISO 845, kg/m3 | 40.1 | 40.7 | 41 | 41.2 | 41.6 |
| Hardness ILD 25%, ISO 2439, N | 105.8 | 78.5 | 95.5 | 94.8 | — |
| Hardness ILD 40%, ISO 2439, N | 134.8 | 107.8 | 128.2 | 126.2 | — |
| Hardness ILD 65%, ISO 2439, N | 266.5 | 238.2 | 270.5 | 269.3 | — |
| SAG-factor, ISO 2439 | 2.5 | 3.1 | 2.8 | 2.8 | — |
| VOC, VDA 278, µg/g | 323 | 4.3 | 2.4 | 17 | 131 |

(*) comparative examples

TABLE 3

Flexible foam formulations, processing parameters and physical properties.

| | Example nr (Reference) | | | | | |
|---|---|---|---|---|---|---|
| | 10 (*) | 11 (*) | 12 (*) | 13 | 14 | 15 |
| Suprasec® 6058 | | | | 94 | 91.8 | 95.8 |
| Suprasec® 2721 | | 11.74 | 36.42 | | | |
| Suprasec® 2615 | 41.33 | 38.556 | 19.52 | | | |
| Suprasec® 2465 | | 6.407 | 14.78 | | | |
| Suprasec® 1055 | 13.77 | | | | | |
| Daltocel® F444 | | | | | 70 | 70 |
| Rokopol® M1170 | | | | 70 | | |
| Caradol® SC 48-08 | | | | 30 | | |
| Daltocel® F428 | | | | | 30 | 30 |
| Arcol® 1374 | | 100 | | | | |
| Alcupol® F2831 | 100 | | | | | |
| Voranol® 6150 | | | 100 | | | |
| Daltocel® F526 | 4.5 | 3 | 3.5 | | | |
| DMEA | 0.08 | 0.104 | 0.063 | | | |
| Jeffcat® Z131 | 0.68 | 0.663 | 0.706 | 0.5 | 0.5 | 0.5 |
| Dabco® EG | 0.242 | | | | | |
| Dabco® 33LV | | 0.15 | 0.15 | | | |
| Dabco® NE300 | | | | 0.2 | 0.2 | 0.2 |
| Coscat® Z22R | | | | 0.23 | 0.23 | 0.23 |
| Glycerol | 0.25 | 0.289 | 0.289 | | | |
| DEOA | | | | 1 | 1 | 1 |
| Tegostab® B8783LF | | 0.15 | 0.15 | | | |
| Dabco® DC 198 | | | | 1.5 | 3 | 3 |
| $H_2O$ | 2.95 | 3.07 | 3.3 | 3 | 3 | 3 |
| Index | 95.5 | 95.3 | 113 | 115.8 | 115 | 120 |

TABLE 3-continued

Flexible foam formulations, processing parameters and physical properties.

| | Example nr (Reference) | | | | | |
|---|---|---|---|---|---|---|
| | 10 (*) | 11 (*) | 12 (*) | 13 | 14 | 15 |
| Physical properties, Test, Unit | | | | | | |
| Density, ISO 845, kg/m$^3$ | 40.7 | 41.9 | 38.8 | 40.1 | 39.4 | 40.8 |
| Hardness CLD 25%, ISO 3386-1, kPa | 1.9 | 2.3 | — | 1.72 | 2.66 | 3.56 |
| Hardness CLD 40%, ISO 3386-1, kPa | 2.6 | 3 | — | 2.25 | 3.28 | 4.36 |
| Hardness CLD 65%, ISO 3386-1, kPa | 6.4 | 7.5 | — | 5.27 | 7.11 | 9.56 |
| Hysteresis loss, ISO 3386-1, % | 23.4 | 24.9 | — | 24.35 | 28.6 | 28 |
| Hardness ILD 25%, ISO 2439, N | 72 | 94 | 117 | 69 | 95 | 127 |
| Hardness ILD 40%, ISO 2439, N | 97 | 125 | 165 | 95 | 125 | 165 |
| Hardness ILD 65%, ISO 2439, N | 211 | 279 | 380 | 204 | 250 | 331 |
| SAG-factor | 2.9 | 3 | 3.2 | 3 | 2.63 | 2.6 |
| Tear Strength, ISO 8067, N/m | 134 | 155 | 168 | 342 | 280 | 331 |
| Tensile Strength, ISO 1798, kPa | 45 | 87 | 90 | 88 | 72 | 92 |
| Elongation, ISO 1798, % | 78 | 111 | 88 | 218 | 163 | 169 |
| Resilience, ISO 8307, % | 62 | 61.3 | 62.7 | 58.3 | 48.6 | 50.3 |
| C.S. Dry 75% at 70° C., ISO1856, % | 3.8 | 3.5 | 5.4 | 3.5 | 2.5 | 3.5 |
| C.S. Dry 90% at 70° C., ISO1856, % | 3.9 | 4.9 | 6.7 | 3.2 | 2.9 | 3.8 |
| C.S. Hum.70% at 50° C., HPU-FT-010, % | 5.3 | 7.2 | 10 | 0.1 | −0.4 | −0.4 |
| Dynamic fatigue ISO 3385 | | | | | | |
| Thickness loss, ISO 3385, % | 1.4 | 1.9 | 3.5 | 1.5 | 1.4 | 1.0 |
| Hardness (ILD 40%) Loss, ISO 3385, N | 22.8 | 28 | 47.1 | 15.7 | 23 | 30 |
| Hardness (ILD 40%) Loss, ISO 3385, % | 25 | 24 | 26.4 | 17.3 | 19.3 | 18.6 |

(*) comparative examples

TABLE 4

Flexible foam formulations and physical properties

| | Example nr (Reference) | | | |
|---|---|---|---|---|
| | 16 (*) CV2664 | 17 (*) CV2663 | 18 CV2665 | 19 CV2660 |
| Unreactive amine catalyst | − | − | − | − |
| Reactive amine catalyst | + | + | + | + |
| Zinc Carboxylate | − | − | + | + |
| Formulation | | | | |
| Suprasec ® 6058 | 93.1 | 91.8 | 93.1 | 91.8 |
| Daltocel ® F444 | 70 | 70 | 70 | 70 |
| Daltocel ® F428 | 30 | 30 | 30 | 30 |
| Jeffcat ® Z131 | 1.3 | 0.5 | 1.3 | 0.5 |
| Dabco ® NE300 | 0.2 | 0.2 | 0.2 | 0.2 |
| Coscat ® Z22R | — | — | 0.23 | 0.23 |
| DEOA | 1 | 1 | 1 | 1 |
| Dabco ® DC 198 | 1.5 | 1.5 | 1.5 | 1.5 |
| H$_2$O | 3 | 3 | 3 | 3 |
| Index | 115 | 115 | 115 | 115 |
| Physical properties, Test, Unit | | | | |
| Density, ISO 845, kg/m3 | 40.5 | 41.6 | 40 | 39.4 |
| Hardness CLD 25%, ISO 3386-1, kPa | 2.4 | 1.7 | 3.7 | 2.9 |
| Hardness CLD 40%, ISO 3386-1, kPa | 3 | 2.3 | 4.3 | 3.5 |
| Hardness CLD 65%, ISO 3386-1, kPa | 6.1 | 5.5 | 8.4 | 7.4 |
| Hysteresis loss, ISO 3386-1, % | 23.5 | 21.6 | 29.7 | 28.2 |
| Hardness ILD 25%, ISO 2439, N | 92 | 56 | 141 | 103 |
| Hardness ILD 40%, ISO 2439, N | 117 | 85 | 177 | 134 |
| Hardness ILD 65%, ISO 2439, N | 222 | 203 | 321 | 261 |
| Unreactive amine catalyst | − | − | − | − |
| Reactive amine catalyst | + | + | + | + |
| Zinc Carboxylate | − | − | + | + |
| Continued physical properties, Test, Unit | | | | |
| SAG-factor, ISO 2439 | 2.4 | 3.6 | 2.3 | 2.5 |
| Tear Strength, ISO 8067, N/m | 201.1 | 243.4 | 183.6 | 180.3 |
| Tensile Strength, ISO 1798, kPa | 63.3 | 55.7 | 65.5 | 69.5 |
| Elongation, ISO 1798, % | 151 | 122.2 | 105.8 | 120.8 |
| Compression set Dry 75% at 70° C., ISO 1856, % | 64 | 9 | 5.4 | 4.2 |
| Compression set Dry 90% at 70° C., ISO 1856, % | 78.7 | 6.4 | 83.7 | 4.5 |

TABLE 4-continued

Flexible foam formulations and physical properties

| | Example nr (Reference) | | | |
|---|---|---|---|---|
| | 16 (*) CV2664 | 17 (*) CV2663 | 18 CV2665 | 19 CV2660 |
| Compression set Hum 70% at 50° C., HPU-FT-010, % | −2.6 | −2.8 | −1.6 | −0.9 |
| MACS 120° C. 5 hrs 70%, ISO1856, % | 13.7 | 6.1 | 29.7 | 4.5 |
| Resilience, ISO 8307, % | 45.7 | 54.4 | 40 | 45.4 |

(*) comparative examples

The invention claimed is:

1. A flexible polyurethane foam prepared using a reactive amine catalyst and a zinc carboxylate catalyst having a hardness of >80 N measured as Indentation Load Deflection ILD according to ISO 2439 at 40% compression, a humid compression set value at 70% and 50° C. of less than 5% measured according to HPU-FT-010, a tear strength higher than 200 N/m measured according to ISO 8067, a hardness loss ILD 40% after dynamic fatigue of less than 20% measured according to ISO 3385 and a VOC emission value <100 μg/g measured according to VDA 278; and wherein the reactive amine catalyst is a tertiary amine that is incorporated into a polyurethane matrix of the polyurethane foam.

2. The flexible polyurethane foam according to claim 1 wherein the reactive amine catalyst used is selected from tertiary amine catalysts which have at least one isocyanate-reactive hydrogen atom and wherein the zinc carboxylate catalyst used is selected from a zinc carboxylate catalyst having 5-18 carbon atoms.

3. The flexible polyurethane foam according to claim 1 having a VOC emission below 50 μg/g, a tear strength more than 250 N/m and a humid compression set value at 70% and 50° C. of less than 1%.

4. A process for making a flexible polyurethane foam comprising reacting a polyisocyanate and a polyol composition at an index of 95-125 wherein the polyol composition comprises a polyoxyethylene polyoxypropylene polyol (a1) having an oxyethylene content of 50-95% by weight, calculated on the weight of this polyol (a1), and a polyoxypropylene polyol (a2), optionally comprising oxyethylene groups, the polyol having an oxyethylene content of 0-49% by weight, calculated on the weight of this polyol (a2), wherein the weight ratio of polyol (a1) and (a2) is in the range of 90:10 to 50:50 and wherein the reaction is conducted in the presence of 1) 1-4 parts by weight of water, 2) 0.2-2 parts by weight of a reactive amine catalyst which is a tertiary amine that is incorporated into a polyurethane matrix of the polyurethane foam, 3) 0.05-0.5 parts by weight of a zinc carboxylate catalyst having 5-18 carbon atoms, 4) 0.1-5 parts by weight of a surfactant and 5) optionally up to 10 parts by weight of an isocyanate-reactive chain extender having 2-8 reactive hydrogen atoms and a molecular weight of up to 999, the amounts of the water, the reactive amine catalyst, the zinc carboxylate, the surfactant and the chain extender being calculated per 100 parts by weight of the polyol composition comprising polyol (a1) and polyol (a2).

5. The process according to claim 4 wherein the reactive amine catalyst is selected from tertiary amine catalysts which have at least one isocyanate-reactive hydrogen atom.

6. The process according to claim 4 any of foregoing claims 4-5 wherein the polyoxyethylene polyoxypropylene polyol (a1) has an average nominal hydroxyl functionality of 2-4, an oxyethylene content of 65-80% by weight calculated on the weight of the polyol (a1) and an average molecular weight of 2000-7000.

7. The process according to claim 4 wherein the polyoxypropylene polyol (a2) has an average nominal hydroxyl functionality of 2-4, an average molecular weight of 2000-7000 and an oxyethylene content of at most 20% by weight, calculated on the weight of the polyol (a2).

8. The flexible polyurethane foam according to claim 2 wherein the reactive amine catalyst used is selected from tertiary amine catalysts which have one or more primary and/or secondary amine groups and/or one or more hydroxy groups.

9. The flexible polyurethane foam according to claim 3 wherein the VOC emission is below 20 μg/g.

10. The process according to claim 4, wherein the weight ratio of polyol (a1) and (a2) is in the range of from 75:25 to 65:35 and the zinc carboxylate catalyst has 6-12 carbon atoms.

* * * * *